US012726900B2

(12) United States Patent
Zhou et al.

(10) Patent No.: US 12,726,900 B2
(45) Date of Patent: Sep. 1, 2026

(54) METHOD FOR MODE CONTROL AND COMMUNICATION DEVICE

(71) Applicant: SPREADTRUM COMMUNICATIONS (SHANGHAI) CO., LTD., Shanghai (CN)

(72) Inventors: Huayu Zhou, Shanghai (CN); Zhenzhu Lei, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 290 days.

(21) Appl. No.: 18/681,979

(22) PCT Filed: Dec. 30, 2021

(86) PCT No.: PCT/CN2021/143424
§ 371 (c)(1),
(2) Date: Feb. 7, 2024

(87) PCT Pub. No.: WO2023/019865
PCT Pub. Date: Feb. 23, 2023

(65) Prior Publication Data

US 2025/0126556 A1 Apr. 17, 2025

(30) Foreign Application Priority Data

Aug. 18, 2021 (CN) ......................... 202110950821.1

(51) Int. Cl.
*H04W 52/02* (2009.01)

(52) U.S. Cl.
CPC ............................... *H04W 52/0216* (2013.01)

(58) Field of Classification Search
None
See application file for complete search history.

(56) References Cited

U.S. PATENT DOCUMENTS

| | | | |
|---|---|---|---|
| 6,678,508 B1 | 1/2004 | Koilpillai et al. | |
| 2010/0013551 A1 | 1/2010 | Reams | |
| 2014/0304566 A1* | 10/2014 | Henderson ............ | G06F 1/3275 714/764 |
| 2020/0029276 A1 | 1/2020 | Kim et al. | |

FOREIGN PATENT DOCUMENTS

| | | |
|---|---|---|
| CN | 102325008 A | 1/2012 |
| CN | 106465261 A | 2/2017 |
| CN | 107113726 A | 8/2017 |
| CN | 108401279 A | 8/2018 |
| CN | 108462985 A | 8/2018 |
| CN | 110089164 A | 8/2019 |

(Continued)

OTHER PUBLICATIONS

Intel Corporation, "DL power consumption reduction for feNB-IoT", 3GPP TSG RAN WG1 Meeting #88bis, R1-1704698, Mar. 25, 2017.

(Continued)

*Primary Examiner* — Suhail Khan
(74) *Attorney, Agent, or Firm* — HAUPTMAN HAM, LLP

(57) ABSTRACT

Embodiments of the disclosure provide a method for mode control and a communication device. The method includes: starting a standby mode.

9 Claims, 6 Drawing Sheets

(56) References Cited

FOREIGN PATENT DOCUMENTS

| | | | |
|---|---|---|---|
| CN | 110505517 | A | 11/2019 |
| CN | 110720256 | A | 1/2020 |
| CN | 111512670 | A | 8/2020 |
| CN | 111699753 | A | 9/2020 |
| CN | 113038578 | A | 6/2021 |
| CN | 113243129 | A | 8/2021 |
| WO | 2021056469 | A1 | 4/2021 |

OTHER PUBLICATIONS

WIPO, International Search Report and Written Opinion for International Application No. PCT/CN2021/143424, Apr. 28, 2022.
First Office Action issued in corresponding CN application No. 202110950821.1 dated Aug. 26, 2025.
Second Office Action issued in corresponding CN application No. 202110950821.1 dated Jan. 30, 2026.

* cited by examiner

START A STANDBY MODE

STOP A STANDBY MODE

METHOD FOR MODE CONTROL AND COMMUNICATION DEVICE

CROSS-REFERENCE TO RELATED APPLICATION(S)

This application is a National Stage of International Application No. PCT/CN2021/143424, field Dec. 30, 2021, which claims priority to Chinese Patent Application No. 202110950821.1, filed Aug. 18, 2021, the disclosures of which are hereby incorporated by reference in their entirety.

TECHNICAL FIELD

This application relates to the field of wireless communication technology, and in particular, to a method for mode control and a communication device.

BACKGROUND

In a new radio (NR) system, a user equipment (UE) in an idle state or an inactive state needs to monitor a paging-related physical downlink control channel (PDCCH), such as a type2-PDCCH, and perform periodic radio resource management (RRM) measurement.

Generally, for monitoring a paging-related PDCCH and performing RRM measurement, after waking up from deep sleep, the UE processes one or more (such as three) synchronization signal/physical broadcast channel block (SS/PBCH block, SSB) bursts. After a certain time-frequency synchronization accuracy (for example, within +200 Hz) is reached, the UE monitors the paging-related PDCCH, and performs the RRM measurement while processing the SSB burst.

However, processing the SSB burst and monitoring the PDCCH both require the use of a legacy receiver, i.e., a receiver used when the UE is in the idle state, the inactive state, or a connected state. Since the legacy receiver has many components, when the UE wakes up from deep sleep, for the legacy receiver, the power (energy) consumption for conversion and the power consumption for processing the SSB burst and monitoring the PDCCH are large. Therefore, how to reduce the power consumption for conversion when the UE wakes up from deep sleep and the power consumption for signal detection is a problem to be solved.

SUMMARY

In a first aspect of embodiments of the disclosure, a method for mode control is provided. The method includes: starting a standby mode.

In a second aspect of embodiments of the disclosure, a method for mode control is provided. The method includes: stopping a standby mode.

In a third aspect of embodiments of the disclosure, a communication device is provided. The communication device includes a transceiver, a memory configured to store computer programs, and a processor configured to execute the computer programs stored in the memory to: start a standby mode.

BRIEF DESCRIPTION OF THE DRAWINGS

FIG. 2 is a schematic flowchart of a method for mode control provided in embodiments of the disclosure.

FIG. 3 is a schematic flowchart of a method for mode control provided in embodiments of the disclosure.

DETAILED DESCRIPTION

Figure 1A:
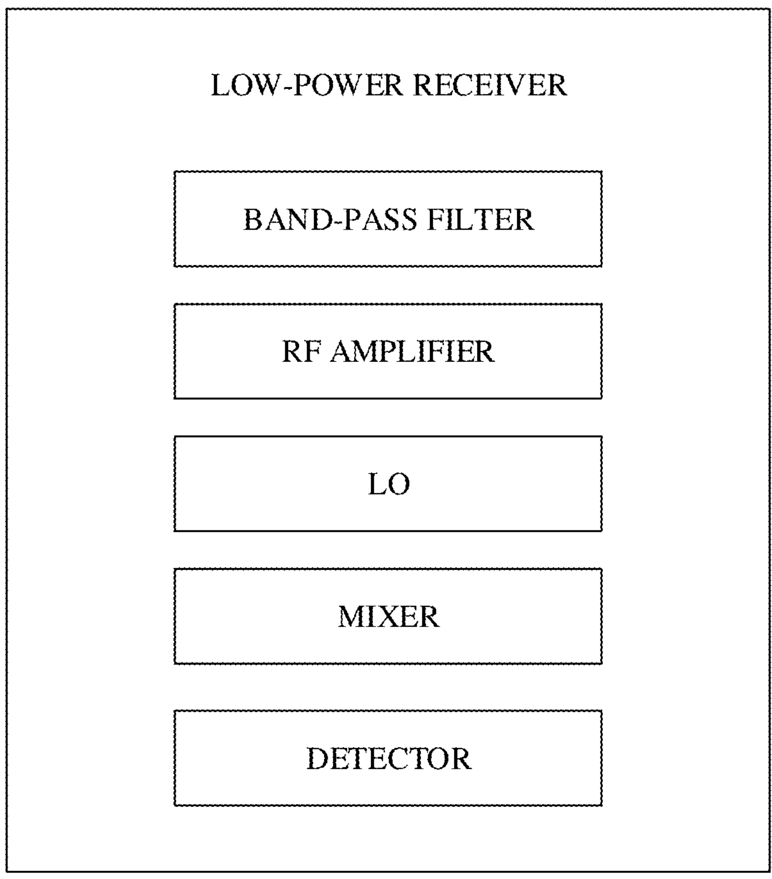
FIG. 1A is a schematic diagram of a system architecture of a low-power receiver provided in embodiments of the disclosure.

It should be understood that, the terms "first", "second", "third", "fourth", and the like used in the disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, and instead, it can optionally include other steps or units that are not listed or other steps or units inherent to the process, method, product, or device.

The term "embodiment" referred to in embodiments of the disclosure means that a particular feature, structure, or characteristic described in conjunction with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

The term "at least one" in the disclosure refers to one or multiple, and the "multiple" refers to two or more. The term "and/or" in embodiments of the disclosure describes an association relationship between associated objects, and indicates that there may be three relationships, for example, A and/or B may mean A alone, both A and B exist, and B alone. A and B each may be a singular from or a plural form. The character "/" herein can indicate that the associated objects are in an "or" relationship. The term "at least one (item) of" or the like in refers to any combination of these items, including any combination of a single item or multiple items. For example, at least one (item) of a, b, or c can represent the following seven cases: a; b; c; a and b; a and c; b and c; a, b, and c. a, b, and c each may be an element or a set including one or more elements.

It should be pointed out that, in embodiments of the disclosure, "equal to" may be used together with "greater than", and this is applicable to a technical solution used when "greater than" is used, or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than". In embodiments of the disclosure, "of", "corresponding or relevant" and "corresponding" can sometimes be used interchangeably. It should be noted that when the difference is not emphasized, their meanings are the same.

In embodiments of the disclosure, the terms "system" and "network" are usually used interchangeably, and those skilled in the art can understand their meanings.

First, some terms involved in embodiments of the disclosure are explained to facilitate understanding by those skilled in the art.

1. User equipment (UE). In embodiments of the disclosure, the UE is a device with wireless transceiver functions, which can be called a terminal device, a terminal, a mobile station (MS), a mobile terminal (MT), or an access UE, a vehicle-mounted UE, an industrial control UE, a UE unit, a UE station, a mobile station, a remote station, a remote UE, a mobile device, a UE, a wireless communication device, a UE agent, or a UE device, etc. UE can be stationary or mobile. It should be noted that the UE may support at least one wireless communication technology, such as long term evolution (LTE), new radio (NR), wideband code division multiple access (WCDMA), etc. For example, the UE can be a mobile phone, a pad, a desktop computer, a notebook computer, an all-in-one computer, a vehicle-mounted terminal, a virtual reality (VR) UE, an augmented reality (AR) UE, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a handheld device with wireless communication functions, a computing device or another processing device connected to a wireless modem, a wearable device, a UE in a future mobile communication network, or a UE in a future evolved public land mobile network (PLMN), etc. In some embodiments of the disclosure, the UE may also be a device with transceiver functions, such as a chip system. The chip system may include a chip and may also include other discrete devices.

2. Network device. In embodiments of the disclosure, the network device is a device that provides wireless communication functions for the UE, which may also be called an access network element, a radio access network (RAN) device, etc. The network device can support at least one wireless communication technology, such as LTE, NR, WCDMA, etc. For example, the network device includes but is not limited to: a next-generation base station (gNB), an evolved node B (eNB), and a radio network controller (RNC), a node B (NB), a base station controller (BSC), a base transceiver station (BTS), a home base station (for example, a home evolved node B, or home node B (HNB)), a baseband unit (BBU), a transmitting and receiving point (TRP), a transmitting point (TP), a mobile switching center, etc. in a 5th-generation (5G) mobile communication system. The network device can also be a wireless controller, a centralized unit (CU), and/or a distributed unit (DU) in a cloud radio access network (CRAN) scenario, or the network device can be a relay station, an access point, a vehicle-mounted device, a UE, a wearable device, and a network device in future mobile communications or a network device in a future evolved PLMN, etc. In some embodiments, the network device may also be a device that provides wireless communication functions for the UE, such as a chip system. For example, the chip system may include a chip and may also include other discrete devices.

3. Idle state. In embodiments of the disclosure, the idle state is a state of the UE. The idle state may involve the following operations: PLMN selection, broadcast of system information, cell reselection mobility, paging initiated by a 5G core network (CN), and discontinuous reception (DRX) for CN paging configured by a non-access stratum (NAS). Idle-state tasks refer to tasks performed or processed by the UE in the idle state.

For example, in embodiments of the disclosure, the idle-state tasks include at least one of: monitoring a short message transmitted with a paging radio network temporary identifier (P-RNTI) over a downlink control information (DCI), monitoring a paging channel for CN paging using a 5G-serving temporary mobile subscriber identity (5G-S-TMSI) (5G-S-TMSI is a shortened form of a 5G globally unique temporary UE identity (5G-GUTI)), performing neighboring cell measurement and cell (re) selection, acquiring system information, periodic radio resource management (RRM) measurement, etc., which is not limited herein.

In embodiments of the disclosure, in the idle state, the UE closes a low-power receiver and opens a legacy receiver. The legacy receiver is configured to process idle-state tasks. In some embodiments, the idle state may include a camped-normally substate, an any-cell-selection substate, a camped-on-any-cell substate, etc.

4. Inactive state. In embodiments of the disclosure, the inactive state is a state of the UE. The inactive state may involve the following operations: PLMN selection, broadcast of system information, cell reselection mobility, paging initiated by a next generation radio access network (NG-RAN), an RAN-based notification area (RNA) managed by an NG-RAN, DRX for RAN paging configured by an NG-RAN, 5GC and NG-RAN connection establishment, storage of UE access layer (AS) context in the NG-RAN and the UE, NG-RAN knowledge of an RNA to which the UE belongs, etc. Inactive-state tasks refer to tasks performed or processed by the UE in the inactive state.

For example, in embodiments of the disclosure, the inactive-state tasks may include at least one of: monitoring a short message transmitted with a P-RNTI over a DCI, monitoring a paging channel for CN paging using a 5G-S-TMSI, performing neighboring cell measurement and cell (re) selection, performing RNA update periodically or when moving outside a RNA, obtaining system information, periodic RRM measurement, small data transmission (SDT), etc., which is not limited herein.

In embodiments of the disclosure, in the inactive state, the UE opens a legacy receiver. The legacy receiver is configured to process idle-state tasks. In the inactive state, the UE may close a low-power receiver. In some embodiments, the inactive state may include a camped-normally substate, an any-cell-selection substate, a camped-on-any-cell substate, etc.

5. Standby mode. In embodiments of the disclosure, the standby mode may be a state of the UE independent of the idle state or the inactive state. In this case, the standby mode may be called a standby state. Alternatively, the standby mode may be a substate of the idle state or the inactive state of the UE. In this case, the standby mode may be called a standby substate.

In the standby mode, the UE closes (or turns off) the legacy receiver and opens (or turns on) the low-power receiver. The low-power receiver can detect a wake-up signal and can, under certain conditions and/or circumstances, run a timer and/or measure a reference signal, etc. In the standby mode, the UE detects a wake-up signal from a network device with the low-power receiver. Upon detecting the wake-up signal, the UE can stop the standby mode. In addition, a timer is introduced, and at the end of the timer, the UE can stop the standby mode. In this way, the standby mode is introduced, and in the standby mode, the UE closes the legacy receiver and only opens the low-power receiver, which help save the power of the UE, thereby reducing the power consumption of the UE.

As mentioned above, after the standby mode is introduced, switching between the idle state and the standby mode (standby state) and switching between the inactive state and the standby mode can be introduced. Alternatively, switching between the camped-normally substate and the standby mode (standby substate) can be introduced.

It should be noted that the introduction of switching between the idle state or the inactive state and the standby mode (standby state) or switching between the camped-normally substate and the standby mode (standby substate) is to enable the UE to start the standby mode for saving power for the UE, and to enable the UE to be woken up or wake up autonomously (via a timer) to perform idle-state tasks or inactive-state tasks. Specifically, in the standby mode, the UE closes the legacy receiver, opens the low-power receiver, and detects a wake-up signal through the low-power receiver. When a wake-up signal is detected by the low-power receiver, the UE needs to stop the standby mode and enter the idle state, the inactive state, or the camped-normally substate. In the idle state, the inactive state, or the camped-normally substate, the UE closes the low-power receiver, opens the legacy receiver, and opens an idle timer. When the idle timer expires, the UE stops the idle state or the inactive state and enters the standby mode.

In some embodiments, the standby mode may be a state independent of the idle state and the inactive state. In this case, the UE can switch between the standby mode and the idle state, and can also switch between the standby mode and the inactive state. The standby mode may also be called a standby state, an intermediate state, an intermediate mode, a first state, or a first mode, etc., which is not limited herein.

In other embodiments, the standby mode is a substate of the idle state or the inactive state. In this case, the UE can switch between the standby mode and other substates of the idle state, and can also switch between the standby mode and other substates of the inactive state. For example, for the camped-normally substate, the UE can switch between the standby mode and the camped-normally substates. It should be noted that the standby mode can also be called a standby substate, a first substate, etc., which is not limited herein.

6. Legacy receiver. In embodiments of the disclosure, the legacy receiver can also be called a regular receiver and has a complete radio frequency (RF) and baseband processing architecture. In some embodiments, in the idle state, the inactive state, or the connected state, the UE uses the legacy receiver. In terms of functional modules, the legacy receiver can include an SSB receiving module, a data/control receiving module, etc.

7. Low-power receiver. In embodiments of the disclosure, to reduce the power consumption for conversion when the legacy receiver wakes up from sleep and the power consumption for signal detection, a low-power receiver independent of the legacy receiver can be adopted to detect a wake-up signal. Without a low-power receiver, the legacy receiver needs to wake up periodically and monitor a paging-related PDCCH to confirm whether the network is paging the legacy receiver. In this case, all circuits inside the legacy receiver need to be opened to monitor the paging-related PDCCH. With a low-power receiver, the UE can detect the wake-up signal during sleep (when the legacy receiver is closed) through the low-power receiver (which requires less power consumption to detect the wake-up signal), and only when the wake-up signal is detected (that is, only when the network needs to wake up the UE), the UE opens the legacy receiver (the possibility that the network needs to wake up the UE is low in some scenarios, for example, at night). In other words, with the low-power receiver, the UE does not need to periodically monitor the paging-related PDCCH through the legacy receiver. Therefore, the power consumption for periodically opening the legacy receiver is omitted. In other words, by adopting the standby mode (in which the UE closes the legacy receiver and opens the low-power receiver) corresponding to the low-power receiver, the power consumption of the UE can be reduced. Such low-power receiver is also called a low-power wake-up signal receiver.

8. Synchronization signal burst. In release 15 (Rel-15) NR, synchronization signals and broadcast channels are transmitted as SSBs, and beam sweeping is introduced in the Rel-15 NR. A primary synchronization signal (PSS), a secondary synchronization signal (SSS), and a PBCH are in an SSB. Each SSB can be regarded as a resource for one beam (analog domain) during beam sweeping. Multiple SSBs can form a SSB burst (for example, L SSBs within 5 milliseconds (ms) form a SSB burst). A SSB burst can be regarded as a relatively concentrated resource containing multiple beams. The SSB is repeatedly transmitted on different beams, which is a beam sweeping process. Through training of beam sweeping, the UE can sense on which beam the strongest signal is received.

For example, time domain positions of the L SSBs within a 5 ms window are fixed. Indexes (for example, from 0 to L−1) of the L SSBs are arranged consecutively in the time domain positions. The transmission time of one L SSB within the 5 ms window is fixed and the index is also fixed.

FIG. 1A is a schematic structural diagram of a low-power receiver according to embodiments of the disclosure. As illustrated, the low-power receiver adopts a first architecture and includes a band-pass filter, an RF amplifier, a local oscillator (LO), a mixer, and a detector.

Figure 1B:
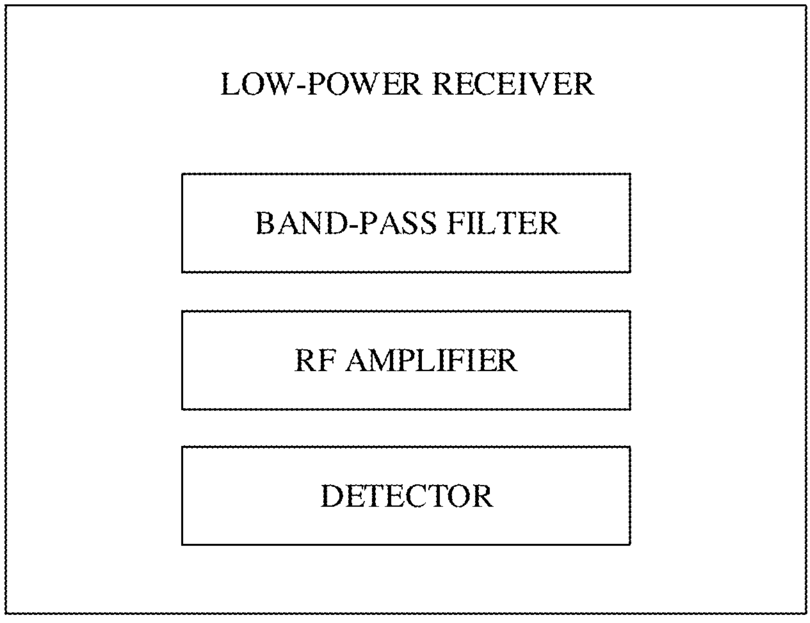
FIG. 1B is a schematic diagram of a system architecture of a low-power receiver provided in embodiments of the disclosure.

FIG. 1B is a schematic structural diagram of a low-power receiver according to embodiments of the disclosure. As illustrated, the low-power receiver adopts a second architecture (also called a passive circuit architecture) and includes a band-pass filter and a detector. The low-power receiver may further include an RF amplifier.

FIGS. 1A and 1B are only examples of the structure of the low-power receiver and do not constitute a limitation on the disclosure. In embodiments of the disclosure, the low-power receiver may include fewer or more components than illustrated in FIGS. 1A and 1B, which is not limited herein. For example, in embodiments of the disclosure, the low-power receiver may also adopt a third architecture, such as an energy harvesting architecture or other architectures, which is not limited herein.

In embodiments of the disclosure, there may be following two receiving methods for the low-power receiver.

In a first receiving method, the low-power receiver periodically detects a wake-up signal. With very few devices to be stopped and opened, the low power receiver consumes very little power for conversion to wake up from sleep. Since a corresponding wake-up signal is specially designed, the power consumption for detecting the wake-up signal is small. Therefore, the low-power receiver consumes less power to detect the wake-up signal.

In a second receiving method, the low-power receiver can always detect a wake-up signal with low power consumption. That is, during sleep (when the legacy receiver is closed), the UE can open the low-power receiver and detect the wake-up signal because the low-power receiver can detect the wake-up signal during sleep. In this way, there is no conversion power of the UE for periodically waking up from sleep, i.e., periodically opening the legacy receiver. In addition, for the second receiving method, since the corresponding wake-up signal is generally specially designed for passive circuits, the power consumption for the low-power receiver to detect the wake-up signal is small.

When the first architecture illustrated in FIG. 1A is adopted, since there is an LO in the first architecture, the low-power receiver has a timer function. When the second architecture illustrated in FIG. 1B or the third architecture is adopted, since there is no LO, the low-power receiver has no timer function or only has a simplified timer function (for example, with a large timer granularity).

In the disclosure, generally, in the idle state, the inactive state, a substate of the idle state, or a substate of the inactive state, the UE needs to wake up periodically and monitor the paging-related PDCCH (or a paging early indication (PEI)), which needs to open the legacy receiver periodically. Therefore, the power (energy) consumption for conversion when the UE periodically wakes up from sleep is large, and the power (energy) consumption for monitoring the paging-related PDCCH (or PEI) is also large.

Therefore, how to reduce the power consumption for conversion when the UE wakes up from sleep and the power consumption for monitoring the paging-related PDCCH (or PEI) is a problem to be solved.

For the above problems, embodiments of the disclosure provide a method for mode control and related products. A standby mode is introduced, so that a UE in the idle state, the inactive state, a substate of the idle state, or a substate of the inactive state can switch to the standby mode. In the standby mode, the UE can close the legacy receiver, open the low-power receiver, and detect the wake-up signal. The power consumption of the UE for detecting the wake-up signal (as well as the power consumption for conversion) is small, which help reduce the power consumption of the UE.

Embodiments of the disclosure will be introduced in detail below with reference to the accompanying drawings.

Figure 1C:
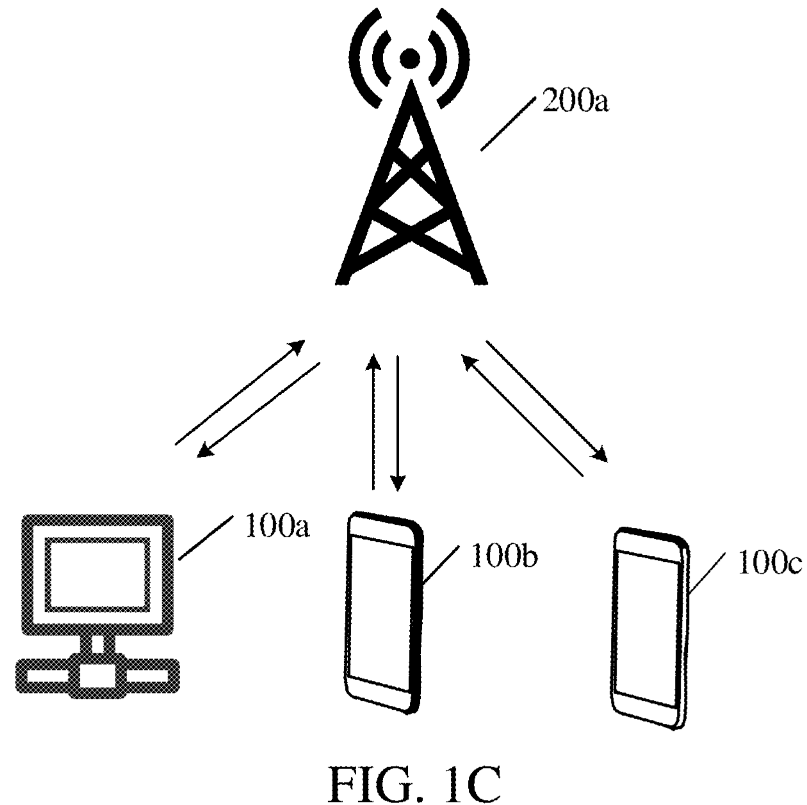
FIG. 1C is a schematic diagram of a network architecture of a communication system provided in embodiments of the disclosure.

FIG. 1C is a schematic diagram of a network architecture of a communication system applicable to embodiments of the disclosure. The communication system illustrated in FIG. 1C includes a UE 100*a*, a UE 100*b*, a UE 100*c*, and a network device (200*a*). The communication connection between the UE 100*a*, the UE 100*b*, the UE 100*c*, and the network device 200*a* may be a wireless communication connection.

The network architecture of the communication system illustrated FIG. 1C is only an example and does not constitute a limitation on embodiments of the disclosure. Embodiments of the disclosure can also be applied to, but not limited to, a relay network architecture, an internet-of-vehicle network architecture, etc.

Figures 2, 3:
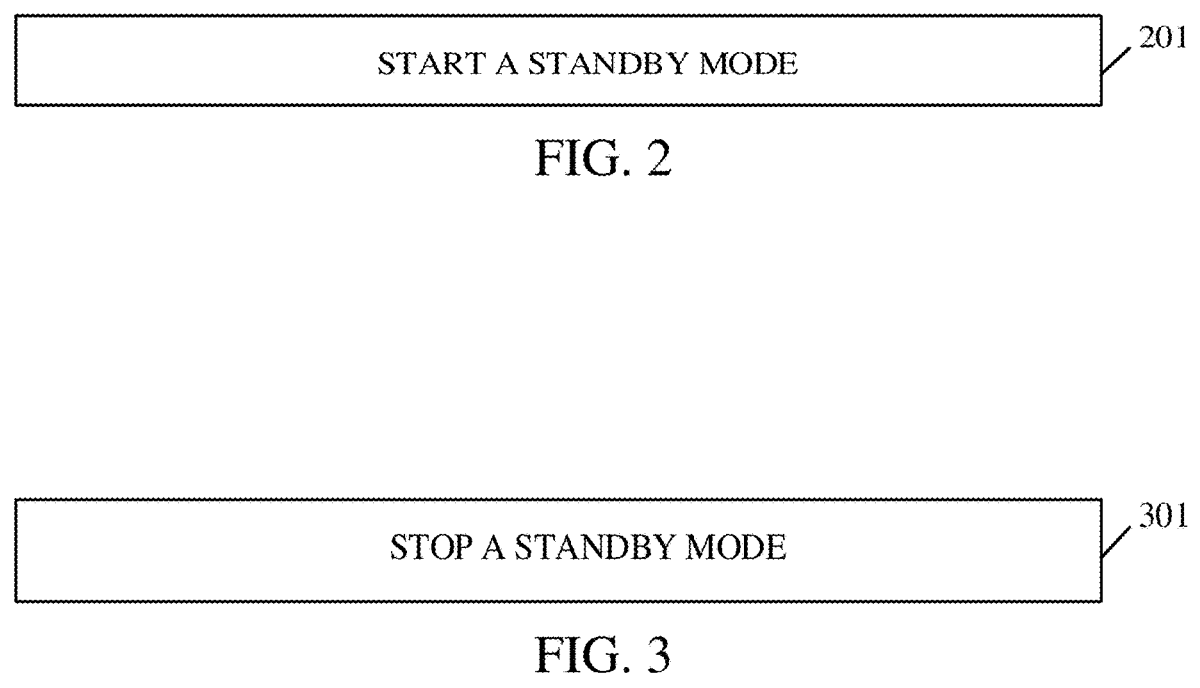

FIG. 2 is a schematic flowchart of a method for mode control according to embodiments of the disclosure. Specifically, the method includes the following.

201. A UE starts a standby mode.

"Start" may be equivalent to "begin" or "open".

In embodiments of the disclosure, the UE can start the standby mode, open a low-power receiver, and close a legacy receiver. Since the legacy receiver is closed, the power consumption of the UE in the standby mode is small.

The switching between the standby mode and other states (an idle state, an inactive state, or a camped-normally substate, etc.) is further described below in combination with different definitions of the standby mode.

Embodiment 1A: The standby mode is a state independent of the idle state or the inactive state. For example, the UE in the idle state or the inactive state switches from the idle state or the inactive state to the standby mode.

In some embodiments, the UE may trigger the start of the standby mode as follows.

The UE starts the standby mode in response to a first timer expiring.

For example, the UE is in the idle state. When the first timer expires, the UE starts the standby mode and switches from the idle state to the standby mode. That is, in the idle state, the UE closes the low-power receiver and opens the legacy receiver. When the first timer expires, the UE starts the standby mode, closes the legacy receiver, and opens the low-power receiver, so that the UE is in the standby mode to save power, which help reduce the power consumption of the UE.

For another example, the UE is in the inactive state. When the first timer expires, the UE starts the standby mode and switches from the inactive state to the standby mode. That is, in the inactive state, the UE closes the low-power receiver and opens the legacy receiver. When the first timer expires, the UE starts the standby mode, closes the legacy receiver, and opens the low-power receiver, so that the UE is in the standby mode to save power, which help reduce the power consumption of the UE.

The expiration of the first timer can be understood as the timing (current time) of the first timer exceeding a first set value. The first set value may be a value set in advance by a user or the UE, a value predefined through a protocol, or a value configured by a network device, etc., which is not limited herein.

More generally, the expiration of the timer means that the timing of the timer exceeds a set value. The set value is a value set in advance by a user or the UE, a value predefined through a protocol, or a value configured by a network device, etc., which is not limited herein.

The first timer may be a timer opened in the idle state or the inactive state. The first timer is used to start the standby mode when the first timer exceeds a first predefined value (that is, when the first timer expires). That is, the UE only stays in the idle state or the inactive state for a period of time, and then switches from the idle state or the inactive state to the standby mode. Alternatively, the first timer is used to monitor the time the UE stays in the idle state or the inactive state, which will not be repeated hereafter.

In embodiments of the disclosure, when the first timer expires, the UE stops the idle state or the inactive state and starts the standby mode. This allows the UE to have more opportunities to start the standby mode (the probability of the expiration of the first timer can be increased through configuration), thereby saving power.

Further, in some embodiments, the UE may have the following behaviors when starting the standby mode.

Behavior 1: The UE skips performing idle-state tasks and/or inactive-state tasks. This helps save the power of the UE and reduce the power consumption of the UE.

It can be understood that skipping performing the idle-state tasks and/or the inactive-state tasks by the UE may be a step in starting the standby mode.

Behavior 2: The UE stops running the first timer.

It can be understood that stopping running the first timer by the UE is a step in starting the standby mode.

The stopping may refer to stopping the timing behavior of the timer (stop the timer) or stopping running the timer, which will not be repeated herein.

For example, when the UE stops running the first timer, the UE can continue running a timer other than the first timer.

For example, when the UE stops running the first timer, the UE closes the legacy receiver and opens the low-power receiver.

Behavior 3: The UE stops running a timer other than the first timer.

For example, when the first timer expires, stop running a timer other than the first timer. That is, when the UE starts the standby mode, the UE stops running a timer other than the first timer. Further, in some embodiments, the UE stops running the first timer when the first timer expires. That is, when the UE starts the standby mode, the UE stops running the first timer.

It should be noted that a timer other than the first timer refer to a timer other than the first timer in the UE.

It can be understood that stopping running a timer other than the first timer by the UE is a step in starting the standby mode.

It should be noted that, in embodiments of the disclosure, no matter whether the UE stops running or continues running the first timer, the UE stops running other timers.

The first timer may continue running if the UE is capable of running a timer in the standby mode.

Behavior 4: The UE stops running all timers. This helps save the power of the UE and reduce the power consumption of the UE.

For example, when the first timer expires, the UE stops running all timers in the UE. That is, when the UE starts the standby mode, the UE stops running all timers in the UE.

Further, in some embodiments, when the first timer expires, the UE stops running the first timer. That is, when the UE starts the standby mode, the UE stops running the first timer.

Further, in some embodiments, when the UE is incapable of running a timer, the UE stops running all timers in the UE.

For example, when the UE stops running all timers, the UE closes the legacy receiver and opens the low-power receiver.

Behavior 5: The UE continues running a timer other than the first timer. This helps save the power of the UE and reduce the power consumption of the UE.

It can be understood that continuing running a timer other than the first timer by the UE is a step in starting the standby mode.

In some embodiments, in the standby mode, the UE skips performing idle-state tasks or inactive-state tasks. However, some or all timers used at an NAS (these timers are defined and used at the NAS) are still running. Therefore, the UE can continue running a timer other than the first timer. That is, in the standby mode, the UE can still perform NAS tasks, such as CN-related tasks. This ensures that the UE can still perform some tasks in the standby mode with the legacy receiver off to ensure that some tasks can proceed normally.

For example, when the UE continues running a timer other than the first timer, the UE closes the legacy receiver and opens the low-power receiver.

Behavior 6: The UE stops running a timer other than the first timer. For example, the UE stops running a timer other than the first timer when the UE is incapable of running a timer in the standby mode. This helps save the power of the UE and reduce the power consumption of the UE.

Further, in embodiments of the disclosure, when the first timer expires, after the standby mode is started, a timer other than the first timer can be stopped. When the UE is incapable of running a timer in the standby mode, in principle, it is necessary to stop any timer.

In the standby mode, the UE closes the legacy receiver and opens the low-power receiver. If there is no structure for running a timer in the architecture of the low-power receiver, it can be understood that the UE is incapable of running a timer in the standby mode. On the contrary, if there is a structure for running a timer in the architecture of the low-power receiver when the UE is in the standby mode, it can be understood that the UE is capable of running a timer in the standby mode, which will not be repeated hereafter.

For example, if the UE is incapable of running a timer in the standby mode, the UE stops running a timer other than the first timer. In this case, the UE closes the legacy receiver and opens the low-power receiver.

Behavior 7: The UE can stop running a timer in response to the UE being incapable of running a timer in the standby mode. This helps save the power of the UE and reduce the power consumption of the UE.

For example, stopping running a timer by the UE can be understood as follows. When the first timer expires, the UE starts the standby mode and stops running all timers (including the first timer) opened in the inactive state or the idle state.

It can be understood that stopping a timer by the UE is a step in starting the standby mode.

Behavior 8: The UE can continue running a timer other than the first timer in response to the UE being capable of running a timer in the standby mode.

For example, continuing running a timer other than the first timer by the UE can be understood as follows. The UE is capable of running a timer in the standby mode, that is, there is a structure for running a timer in the architecture of the low-power receiver. When the first timer expires, the UE starts the standby mode, and the UE can continue running a timer other than the first timer.

Further, when the first timer expires, the UE may stop running the first timer.

For example, when the UE continues running a timer other than the first timer, the UE closes the legacy receiver and opens the low-power receiver.

It can be understood that continuing running a timer other than the first timer by the UE if the UE is capable of running a timer in the standby mode is a step in starting the standby mode.

As can be seen, in embodiments of the disclosure, the UE can close the legacy receiver and open the low-power receiver. This helps save the power of the UE and reduce the power consumption of the UE. In addition, if the UE is capable of running a timer in the standby mode, all running timers can continue running. In this way, although the UE skips performing idle-state tasks and/or inactive-state tasks, the UE can still continue running a timer for performing NAS tasks. In this way, the UE can still perform NAS tasks, such as CN-related tasks. This ensures that the UE can still be triggered to perform NAS tasks in the standby mode when the legacy receiver is closed, thereby ensuring that NAS tasks can be performed normally.

Behavior 9: The UE starts a second timer. This allows the UE to stop the standby mode when the second timer expires, thereby switching from the standby mode to other states, such as the idle state or the inactive state. This prevents the UE from being unable to be woken up. For example, when the signal-to-noise ratio is low and the UE misses a wake-up signal, the UE may be unable to be woken up.

It should be noted that, in embodiments of the disclosure, the second timer may be different from the first timer. For example, the first timer may be called an idle timer, and the second timer may be called a standby timer.

The expiration of the second timer can be understood as the timing (current time) of the second timer exceeding a second set value. The second set value may be a value set in advance by a user or the UE, a value predefined through a protocol, or a value configured by a network device, etc., which is not limited herein.

More generally, the expiration of the timer means that the timing of the timer exceeds a set value. The set value is a value set in advance by a user or the UE, a value predefined through a protocol, or a value configured by a network device, etc., which is not limited herein.

The second timer may be a timer opened in the standby mode. The second timer is used to start the idle state or the inactive state when the second timer exceeds a second predefined value (that is, when the second timer expires). That is, the UE only stays in the standby mode for a period of time, and then switches from the standby mode to the idle state or the inactive state. Alternatively, the second timer is used to monitor the time the UE stays in the standby mode, which will not be repeated hereafter.

In embodiments of the disclosure, when the second timer expires, the UE stops the standby mode and starts the idle state or the inactive state. This prevents the UE from missing a wake-up signal and being in the standby mode for a long time and unable to be woken up (which causes the network to be unreachable).

It can be understood that starting the second timer by the UE may be a step in starting the standby mode.

Behavior 10: The UE starts the second timer in response to the UE being capable of running a timer in the standby mode. This allows the UE to stop the standby mode when the second timer expires, thereby switching from the standby mode to other states, such as the idle state or the inactive state. This prevents the UE from being unable to be woken up. For example, when the signal-to-noise ratio is low and the UE misses a wake-up signal, the UE may be unable to be woken up.

For the second timer, reference can be made to the relevant introduction in Behavior 9, which will not be repeated herein.

It can be understood that starting the second timer by the UE when the UE is capable of running a timer in the standby mode may be a step in starting the standby mode.

Embodiment 2A: The standby mode is a substate of the idle state or the inactive state. In this case, for example, the standby mode is called a standby substate, and embodiments of the disclosure will be explained in detail.

For example, the UE is in a camped-normally substate and switches from the camped-normally substate to the standby substate, and embodiments of the disclosure will be described. For the switching between other substates of the idle state or the inactive state and the standby substate, reference can be made to the switching between the camped-normally substate and the standby substate, which will not be repeated herein.

In some embodiments, the UE may trigger the start of the standby mode as follows.

When the first timer expires, the UE starts the standby mode and switches from the camped-normally substate to the standby substate. That is, in the camped-normally substate, the UE closes the low-power receiver and opens the legacy receiver. When the first timer expires, the UE starts the standby mode, closes the legacy receiver, and opens the low-power receiver, so that the UE is in the standby mode to save power, which help reduce the power consumption of the UE.

The expiration of the first timer means that the timing (current time) of the first timer exceeds a first set value. The first set value may be a value set in advance by a user or the UE, a value predefined through a protocol, or a value configured by a network device, etc., which is not limited herein.

More generally, the expiration of the timer means that the timing of the timer exceeds a set value. The set value is a value set in advance by a user or the UE, a value predefined through a protocol, or a value configured by a network device, etc., which is not limited herein.

The first timer may be a timer opened in the camped-normally substate. The first timer is used to start the standby mode when the first timer exceeds a first predefined value (that is, when the first timer expires). That is, the UE only stays in the camped-normally substate for a period of time, and then switches from the camped-normally substate to the standby mode. Alternatively, the first timer is used to monitor the time the UE stays in the camped-normally substate, which will not be repeated hereafter.

In embodiments of the disclosure, when the first timer expires, the UE stops the camped-normally substate and starts the standby mode. This allows the UE to have more opportunities to start the standby mode (the probability of the expiration of first timer can be increased through configuration), thereby saving power.

For behaviors involved in terms of starting the standby mode by the UE, reference can be made to the relevant description of Embodiment 1A, which will not be repeated herein.

FIG. 3 is a schematic flowchart of a method for mode control provided in embodiments of the disclosure. Specifically, the method includes the following.

301. A UE stops a standby mode.

"Stop" may be equivalent to "end" or "close".

In embodiments of the disclosure, the UE stops the standby mode, thereby closing a low-power receiver and opening a legacy receiver, so that the UE is in an idle state or an inactive state and can perform idle-state tasks or inactive-state tasks, or the UE is in a camped-normally substate and can perform camped-normally substate tasks.

The switching between the standby mode and other states is further described below in combination with different definitions of the standby mode.

Embodiment 1B: The standby mode is a state independent of the idle state or the inactive state. For example, the UE stops the standby state and switches from the standby state to the idle state or the inactive state.

In embodiments of the disclosure, the UE can stop the standby mode and stay in the idle state or the inactive state (whether the UE stays in the idle state or the inactive state is related to whether the UE is in the idle state or the inactive state before starting the standby mode). In other words, the UE can stop the standby mode and perform idle-state tasks or inactive-state tasks. That is, the UE can stop the standby mode, open the legacy receiver, and perform idle-state tasks or inactive-state tasks.

In some embodiments, the UE may trigger the stop of the standby mode as follows.

Method 1: The UE detects a wake-up signal. When or after detecting a wake-up signal, the UE stops the standby mode. That is, when or after detecting a wake-up signal, the UE opens the legacy receiver, thereby switching from the standby mode to the idle state or the inactive state. In this way, when the UE only opens the low-power receiver, the network is still reachable. That is, the UE can detect a wake-up signal from a network device in the standby mode, thereby ensuring that the UE can be woken up from the standby mode and avoiding a situation where the UE cannot be woken up.

Method 2: When a second timer expires, the UE stops the standby mode. That is, when the second timer expires, the UE can open the legacy receiver, thereby switching from the standby mode to the idle state or the inactive state. In this way, when the UE only opens the low-power receiver, the network is still reachable. That is, the UE can open the second timer in the standby mode, thereby ensuring that the UE automatically triggers wake-up from the standby mode (when the second timer expires) and avoiding a situation where the UE cannot be woken up.

The expiration of the second timer means that the timing (current time) of the second timer exceeds a second set value. The second set value may be a value set in advance by a user or the UE, a value predefined through a protocol, or a value configured by a network device, etc., which is not limited herein.

More generally, the expiration of the timer means that the timing of the timer exceeds a set value. The set value is a value set in advance by a user or the UE, a value predefined through a protocol, or a value configured by a network device, etc., which is not limited herein.

The second timer may be a timer opened in the standby mode. The second timer is used to start the idle state or the inactive state when the second timer exceeds a second predefined value (that is, when the second timer expires). That is, the UE only stays in the standby mode for a period of time, and then switches from the standby mode to the idle state or the inactive state. Alternatively, the second timer is used to monitor the time the UE stays in the standby mode, which will not be repeated hereafter.

In embodiments of the disclosure, when the second timer expires, the UE stops the standby mode and starts the idle state or the inactive state. This prevents the UE from missing a wake-up signal and being in the standby mode for a long time and unable to be woken up (which causes the network to be unreachable).

In embodiments of the disclosure, the UE can stop the standby mode when the second timer expires if the UE is capable of running a timer in the standby mode.

Method 3: When the UE measures that a second measurement value is less than or equal to a second threshold, the UE stops the standby mode. That is, when detecting that the second measurement value is less than or equal to the second threshold, the UE can open the legacy receiver and switch from the standby mode to the idle state or the inactive state, thereby avoiding a situation where the UE cannot be woken up.

The second measurement value may refer to a measurement value obtained by measuring a reference signal by the low-power receiver. This reference signal can have some or all of characteristics of a wake-up signal. Some or all characteristics of the wake-up signal may include a waveform, a modulation scheme, etc.

For example, the second measurement value may refer to a measurement value obtained by measuring a reference signal, which may include at least one of: a reference signal received power (RSRP) of the reference signal, a reference signal received quality (RSRQ) of the reference signal, a received signal strength indication (RSSI) of the reference signal, a signal to interference plus noise ratio (SINR) of the reference signal, etc., which is not limited herein. The second measurement value may also refer to an RRM measurement value, which includes at least one of: an RSRP, an RSRQ, an RSSI, an SINR, etc., which is not limited herein.

The RSRP of the reference signal may be a linear average over power contributions (in [W]) of resource elements carrying the reference signal. The RSRQ of the reference signal may be a ratio of N×RSRP/NR carrier RSSI, where N is the number of resource blocks in an RSSI measurement bandwidth of the NR carrier, and RSRP is the RSRP of the reference signal. The RSSI of the reference signal may be a linear average of a total received power (in [W]) of the reference signal. The SINR of the reference signal may be the linear average of the power contribution (in [W]) of the resource elements carrying the reference signal divided by a linear average contribution of a noise and interference power. If the SINR is used for layer 1 (L1) SINR reporting with a dedicated interference measurement resource, interference and noise are measured on a resource indicated by a higher layer. Otherwise, interference and noise are measured on the resource element carrying the reference signal within the same frequency bandwidth.

For periodic measurement, the reference signal may be transmitted periodically.

For example, the second threshold may be configured by a base station for the UE or predefined (i.e., default), predefined through a protocol, or configured by a network device, etc., which is not limited herein.

In a possible example, corresponding to the method 3, the UE obtains the second measurement value by measuring the reference signal. Therefore, the UE can determine whether to stop the standby mode based on the second measurement value obtained by measuring the reference signal. For example, the reference signal may be transmitted by a network device such as a base station.

The reference signal is used to be measured to obtain the second measurement value. In embodiments of the disclosure, the wake-up signal is transmitted through discontinuous transmission (DTX). Therefore, the wake-up signal is difficult to be used for periodic measurement by the UE. That is, the base station needs to transmit a periodic reference signal dedicated for measurement, so that the UE can perform measurement based on the reference signal to obtain the second measurement value.

In a possible example, the reference signal includes a cell identity (ID). The UE can distinguish a current cell from other cells based on the cell ID, thereby preventing the UE from still trying to detect a wake-up signal of the current cell when losing coverage of the current cell, which results in additional power consumption.

For example, a sequence generator of the reference signal contains a cell ID. Alternatively, the sequence generator of the reference signal may contain the cell ID for initialization. In addition, the sequence generator of the reference signal may also include other IDs for initialization, which is not limited herein.

Further, in some embodiments, the UE may have the following behaviors when stopping the standby mode.

Behavior 1: The UE starts a first timer. The first timer can be used to monitor the time the UE stays in the idle state or the inactive state, which will not be repeated hereafter.

It can be understood that starting the first timer by the UE may be a step in stopping the standby mode.

Behavior 2: The UE performs idle-state tasks and/or inactive-state tasks. The UE opens the legacy receiver, so that the UE can perform the idle-state tasks and/or the inactive-state tasks.

It can be understood that performing the idle-state tasks and/or the inactive-state tasks by the UE may be a step in stopping the standby mode.

Behavior 3: The UE sets the value of the first timer to a first set value in response to a first measurement value being less than or equal to a first threshold.

The first measurement value can be understood as an RRM measurement value, which may include at least one of: an RSRP, an RSRQ, an RSSI, an SINR, etc., which is not limited herein.

The RSRP may be a linear average of over power contributions (in [W]) of resource elements carrying a synchronization signal. The RSRQ may be a ratio of N×RSRP/RSSI of an NR carrier, where N is the number of resource blocks in an RSSI measurement bandwidth of the NR carrier. The RSSI may be a linear average of a total received power (in [W]). The SINR may be the linear average of the power contribution (in [W]) of the resource elements carrying the synchronization signal divided by a linear average contribution of a noise and interference power. If the SINR is used for L1-SINR reporting with a dedicated interference measurement resource, interference and noise are measured on a resource indicated by a higher layer. Otherwise, interference and noise are measured on the resource element carrying the synchronization signal within the same frequency bandwidth.

The first threshold may be configured by a base station for the UE or predefined (i.e., a default value), which is not limited herein.

In some embodiments, the first value in embodiments of the disclosure may be infinity.

For example, when the first measurement value corresponds to different types (such as types of UE, types of low-power receiver, etc.), the first measurement value may correspond to different first thresholds.

In embodiments of the disclosure, when the UE starts the standby mode, the UE can open the low-power receiver and close the legacy receiver. Generally, the low-power receiver has lower sensitivity and can only work in a situation where the received signal quality is good (for example, the first measurement value is large). When the UE is located at the edge of a cell or out of the coverage of the cell, the received signal quality is poor. In this case, it is of little significance for the UE to use the low-power receiver (start the standby mode). Instead, there is a risk that the UE may be difficult to be woken up by the network device. Therefore, the first set value can be set to infinity, so that the first timer will not expire and the UE will not enter the standby mode, thereby preventing the UE from being unable to be woken up by the network device.

Further, when the first measurement value is greater than the first threshold, the time of the first timer can be set to a predefined value, and the predefined value is smaller than the first set value. The predefined value may be configured by a base station for the UE or predefined (that is, a default value), which is not limited herein.

The UE sets the time of the first timer to a finite value, so that the first timer will expire after a certain period of time and the UE will enter the standby mode, thereby reducing the risk that the UE is difficult to be woken up by the network. When the time of the first timer is set to zero, it is equivalent to restarting the first timer.

It should be noted that, in embodiments of the disclosure, the time of the first timer may be the timing (current time) of the first timer. For example, the time of the first timer is 5 ms (i.e., the timing of the first timer is 5 ms). If the first set value is 10 ms, the first timer will expire after 5 ms.

Behavior 4: The UE stops running the first timer if the first measurement value is less than or equal to the first threshold.

For the first measurement value and the first threshold, reference can be made to the relevant introduction in Behavior 11, which will not be repeated herein.

When the UE is located at the edge of a cell or out of the coverage of the cell, the received signal quality is poor (for example, the first measurement value is small). In this case, it is of little significance for the UE to stay in the standby mode. Instead, there is a risk that the UE may be difficult to be woken up by the network device. Therefore, the UE can stop running the first timer, so that the first timer will not expire and the standby mode will not be triggered. This prevents the UE from being unable to be woken up by the network device.

Behavior 5: The UE can restart the first timer in response to performing tasks such as a random access procedure, RRM measurement, cell reselection evaluation, or cell selection.

When performing tasks such as an random access procedure, RRM measurement, cell reselection evaluation, or cell selection, the UE needs a certain amount of time to complete the tasks. If the first timer is not restarted at this time, the UE may switch to the standby mode before completing the tasks, which will cause the failure of the UE to perform idle-state tasks and/or inactive-state tasks. Therefore, the UE can restart the first timer when performing tasks such as a random access procedure, RRM measurement, cell reselection evaluation, or cell selection.

In another way, the UE can stop running the first timer when performing tasks such as a random access procedure, RRM measurement, cell reselection evaluation, or cell selection.

Behavior 6: The UE can restart the first timer in response to performing SDT tasks.

The SDT tasks is a method of data transmission when the UE is in the inactive state. When performing SDT tasks, the UE needs a certain amount of time to complete the SDT tasks. If the first timer is not restarted at this time, the UE may switch to the standby mode before completing the SDT tasks, which will cause the failure of the UE to perform the SDT tasks. Therefore, the UE can restart the first timer when performing SDT tasks.

In another way, the UE can stop running the first timer when performing SDT tasks.

Embodiment 2B: The standby mode is a substate of the idle state or the inactive state. In this case, for example, the standby mode is called a standby substate, and embodiments of the disclosure will be explained in detail.

For example, the UE is a camped-normally substate and switches from the standby substate to the camped-normally substate, and embodiments of the disclosure will be described. For the switching between the standby substate and other substates of the idle state or the inactive state, reference can be made to the switching between the standby substate and the camped-normally substate, which will not be repeated herein.

In embodiments of the disclosure, the UE can stop the standby substate and stays in the camped-normally substate. In other words, the UE can stop the standby substate and perform camped-normally substate tasks. That is, the UE can stop the standby substate, open the legacy receiver, and perform camped-normally substate tasks.

In some embodiments, the UE may trigger the stop of the standby substate as follows.

Method 1: The UE detects a wake-up signal. When or after detecting a wake-up signal, the UE stops the standby substate. That is, when detecting a wake-up signal, the UE closes the low-power receiver and opens the legacy receiver, thereby switching from the standby substate to the camped-normally substate. In this way, when the UE only opens the low-power receiver, the network is still reachable. That is, the UE can detect a wake-up signal from a network device in the standby mode, thereby ensuring that the UE can be woken up from the standby mode and avoiding a situation where the UE cannot be woken up.

Method 2: When a second timer expires, the UE can stop the standby substate. That is, when the second timer expires, the UE can close the low-power receiver and open the legacy receiver, thereby switching from the standby substate to the camped-normally substate. In this way, when the UE only opens the low-power receiver, the network is still reachable. That is, the UE can open the second timer in the standby mode, thereby ensuring that the UE automatically triggers wake-up from the standby mode (when the second timer expires) and avoiding a situation where the UE cannot be woken up.

The expiration of the second timer means that the timing (current time) of the second timer exceeds the second set value. The second set value may be a value set in advance by a user or the UE, a value predefined through a protocol, or a value configured by a network device, etc., which is not limited herein.

More generally, the expiration of the timer means that the timing of the timer exceeds a set value. The set value is a value set in advance by a user or the UE, a value predefined through a protocol, or a value configured by a network device, etc., which is not limited herein.

The second timer may be a timer opened in the standby mode. The second timer is used to start the camped-normally substate when the second timer exceeds a second predefined value (that is, when the second timer expires). That is, the UE only stays in the standby substate for a period of time, and then switches from the standby substate to the camped-normally substate. Alternatively, the second timer is used to monitor the time the UE stays in the standby substate, which will not be repeated hereafter.

In embodiments of the disclosure, when the second timer expires, the UE stops the standby substate and starts the camped-normally substate. This prevents the UE from missing a wake-up signal and being in the standby state for a long time and unable to be woken up (which causes the network to be unreachable).

In embodiments of the disclosure, the UE can stop the standby substate when the second timer expires if the UE is capable of running a timer in the standby substate.

Method 3: When the UE measures that a second measurement value is less than or equal to a second threshold, the UE stops the standby substate. That is, when detecting that the second measurement value is less than or equal to the second threshold, the UE can close the low-power receiver and open the legacy receiver, thereby switching from the standby substate to the camped-normally substate, which prevents the UE from being unable to be woken up.

The second measurement value may refer to a measurement value obtained by measuring a reference signal by a low-power receiver. The reference signal may be one that uses some or all of the characteristics of the wake-up signal. Some or all characteristics of the wake-up signal may include waveform, modulation method, etc.

For example, the second measurement value may refer to a measurement value obtained by measuring a reference signal, which may include at least one of: an RSRP of the reference signal, an RSRQ of the reference signal, an RSSI of the reference signal, an SINR of the reference signal, etc., which is not limited herein. The second measurement value may also refer to an RRM measurement value, which may also include at least one of: an RSRP, an RSRQ, an RSSI, an SINR, etc., which is not limited herein. For periodic measurement, the reference signal may be transmitted periodically.

The RSRP of the reference signal may be a linear average over power contributions (in [W]) of resource elements carrying the reference signal. The RSRQ of the reference signal may be a ratio of N×RSRP/NR carrier RSSI, where N is the number of resource blocks in an RSSI measurement bandwidth of the NR carrier, and RSRP is the RSRP of the reference signal. The RSSI of the reference signal may be a linear average of a total received power (in [W]) of the reference signal. The SINR of the reference signal may be the linear average of the power contribution (in [W]) of the resource elements carrying the reference signal divided by a linear average contribution of a noise and interference power. If the SINR is used for layer 1 (L1) SINR reporting with a dedicated interference measurement resource, interference and noise are measured on a resource indicated by a higher layer. Otherwise, interference and noise are measured on the resource element carrying the reference signal within the same frequency bandwidth.

For periodic measurement, the reference signal may be transmitted periodically.

For example, the second threshold may be configured by a base station for the UE or predefined (i.e., default), predefined through a protocol, or configured by a network device, etc., which is not limited herein.

In a possible example, corresponding to the method 3, the UE obtains the second measurement value by measuring the reference signal. Therefore, the UE can determine whether to stop the standby substate based on the second measurement value obtained by measuring the reference signal. For example, the reference signal may be transmitted by a network device such as a base station.

The reference signal is used to be measured to obtain the second measurement value. In embodiments of the disclosure, the wake-up signal is transmitted through discontinuous transmission (DTX). Therefore, the wake-up signal is difficult to be used for periodic measurement by the UE. That is, the base station needs to transmit a periodic reference signal dedicated for measurement, so that the UE can perform measurement based on the reference signal to obtain the second measurement value.

In a possible example, the reference signal includes a cell identity (ID). The UE can distinguish a current cell from other cells based on the cell ID, thereby preventing the UE from still trying to detect a wake-up signal of the current cell when losing coverage of the current cell, which results in additional power consumption.

For example, a sequence generator of the reference signal contains a cell ID. Alternatively, the sequence generator of the reference signal may contain the cell ID for initialization. In addition, the sequence generator of the reference signal may also include other IDs for initialization, which is not limited herein.

Further, for behaviors which may be involved in stopping the standby substate by the UE, reference can be made to the relevant introduction of behaviors which may be involved in stopping the standby mode by the UE in Embodiment 1B, which will not be repeated herein.

Consistent with the above, the following describes a device configured to perform the method for mode control mentioned-above.

Figure 4:
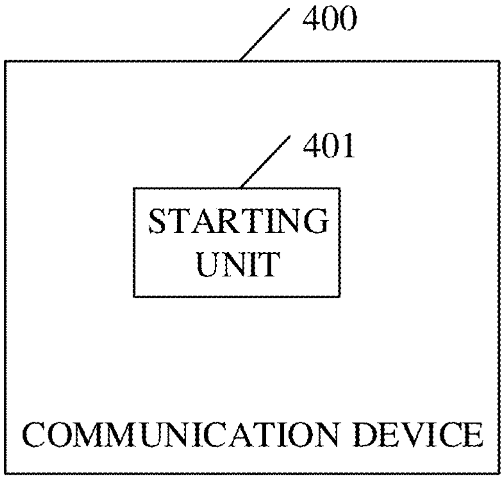
FIG. 4 is a schematic structural diagram of a communication device provided in embodiments of the disclosure.

FIG. 4 is a schematic structural diagram of a communication device 400 provided in embodiments of the disclosure. The communication device 400 described in embodiments is applicable to a UE. The device includes a starting unit 401. The starting unit 401 is configured to start a standby mode.

The starting unit 401 may be configured to perform the method described in step 201.

As can be seen, through the communication device described in embodiments of the disclosure, the standby mode can be started, and in the standby mode, the legacy receiver is closed, that is, only the low-power receiver is opened, and the power consumption for detecting a wake-up signal in the standby mode is small, which help reduce the power consumption for signal detection.

In a possible example, in terms of starting the standby mode, the starting unit 401 is specifically configured to: start the standby mode in response to a first timer expiring.

In a possible example, in terms of starting the standby mode, the starting unit 401 is specifically configured to: skip performing idle-state tasks and/or inactive-state tasks in response to the first timer expiring.

In a possible example, in terms of starting the standby mode, the starting unit 401 is specifically configured to: stop running a first timer.

In a possible example, in terms of starting the standby mode, the starting unit 401 is specifically configured to: stop running a timer other than a first timer.

In a possible example, in terms of starting the standby mode, the starting unit 401 is specifically configured to: stop running a timer.

In a possible example, in terms of starting the standby mode, the starting unit 401 is specifically configured to: continue running a timer other than a first timer.

In a possible example, in terms of starting the standby mode, the starting unit 401 is specifically configured to: start a second timer in response to a UE being capable of running a timer in the standby mode.

Figure 5:
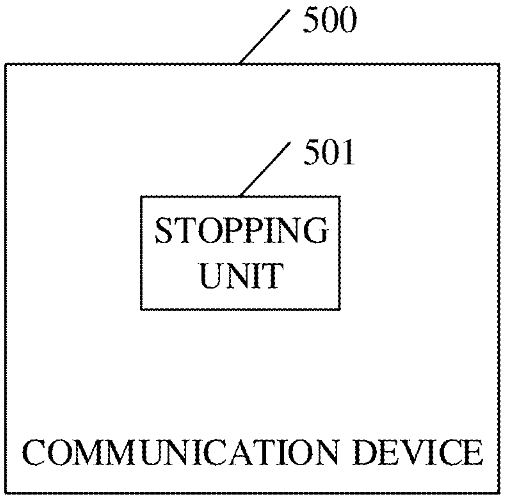
FIG. 5 is a schematic structural diagram of a communication device provided in embodiments of the disclosure.

FIG. 5 is a schematic structural diagram of a communication device 500 provided in embodiments of the disclosure. The communication device 500 described in embodiments is applicable to a UE. The device includes a stopping unit 501. The stopping unit 501 is configured to stop a standby mode.

The stopping unit 501 may be configured to perform the method described in step 301.

As can be seen, through the communication device described in embodiments of the disclosure, the standby mode can be introduced. The standby mode is stopped, the legacy receiver is opened, and the UE stays in the idle state or the inactive state. Alternatively, the standby substate is stopped and the UE stays in the camped-normally substate. In this way, the UE can perform idle-state tasks, inactive-state tasks, or camped-normally substate tasks.

In a possible example, in terms of stopping the standby mode, the stopping unit 501 is specifically configured to: start a first timer in response to stopping the standby mode.

In a possible example, in terms of stopping the standby mode, the stopping unit 501 is specifically configured to: detect a wake-up signal, and stop the standby mode.

In a possible example, in terms of stopping the standby mode, the stopping unit 501 is specifically configured to: perform idle-state tasks and/or inactive-state tasks.

In a possible example, in terms of stopping the standby mode, the stopping unit 501 is specifically configured to: stop the standby mode in response to a second measurement value being less than or equal to a second threshold.

In a possible example, in terms of stopping the standby mode, the stopping unit 501 is specifically configured to: stop the standby mode in response to a second timer expiring.

In a possible example, in terms of stopping the standby mode, the stopping unit 501 is specifically configured to: perform idle-state tasks and/or inactive-state tasks.

It can be understood that functions of program modules of the communication device in embodiments can be specifically implemented according to the method in above method embodiments, and the specific implementation process can be referred to the relevant description in above method embodiments, which will not be repeated herein.

Each module/unit included in each apparatus or product described in the foregoing implementations may be a software module/unit, a hardware module/unit, a software module/unit, or a hardware module/unit. For example, with regard to various apparatuses and products applied to or integrated in a chip, various modules/units contained therein can all be realized by means of hardware, such as a circuit, or at least some of the modules/units can be realized by means of a software program running on a processor integrated inside the chip, and the remaining (if any) part of the modules/units can be realized by means of hardware, such as a circuit. With regard to various apparatuses and products applied to or integrated in a chip module, various modules/units contained therein can all be realized by means of hardware, such as a circuit. Different modules/units may be located in the same component (e. g., chip, circuit module, etc.) of a chip module or in different components. Alternatively, at least part of the modules/units may be implemented using a software program running on a processor integrated within the chip module. The rest (if any) of the modules/units may be implemented by hardware such as circuits. With regard to various apparatuses and products applied to or integrated in a terminal device, various modules/units contained therein can all be realized by means of hardware, such as a circuit. Different modules/units may be located in the same component (for example, a chip, a circuit module, and so on) or different components in the terminal device. Alternatively, at least some of the modules/units may be implemented by using a software program running on a processor integrated inside the terminal device. The rest (if any) of the modules/units may be implemented by hardware such as circuits.

Figure 6:
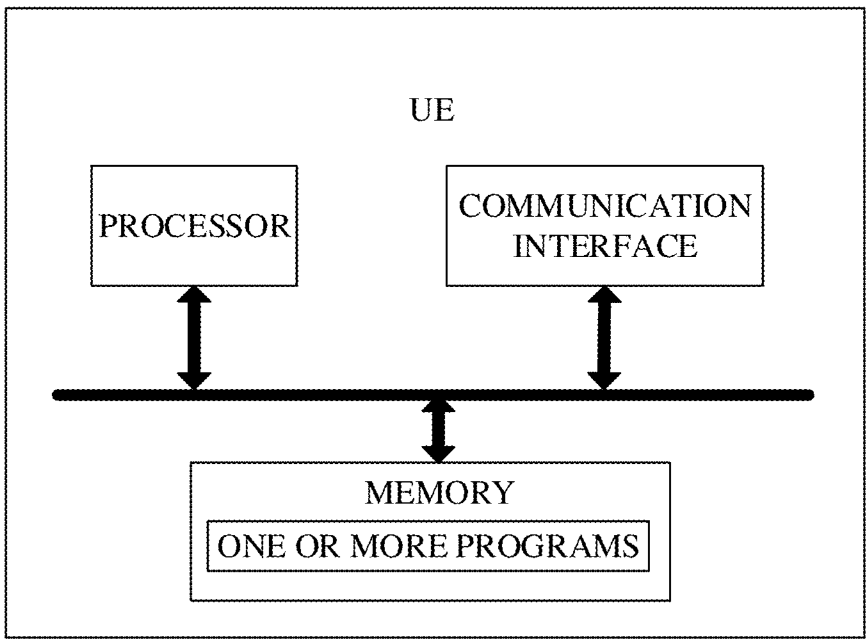
FIG. 6 is a schematic structural diagram of a user equipment (UE) provided in embodiments of the disclosure.

Consistent with the above, FIG. 6 is a schematic structural diagram of a UE provided in embodiments of the disclosure. As illustrated, the UE includes a processor, a memory, a communication interface, and one or more programs. The one or more programs are stored in the memory and configured to be executed by the processor.

In a possible example, in embodiments of the disclosure, the program includes instructions to: start a standby mode.

Optionally, in terms of starting the standby mode, the program includes instructions to: start the standby mode in response to a first timer expiring.

Optionally, in terms of starting the standby mode, the program includes instructions to: skip performing idle-state tasks and/or inactive-state tasks in response to a first timer expiring.

Optionally, in terms of starting the standby mode, the program includes instructions to: stop running a first timer.

Optionally, in terms of starting the standby mode, the program includes instructions to: stop running a timer other than a first timer.

Optionally, in terms of starting the standby mode, the program includes instructions to: stop running a timer.

Optionally, in terms of starting the standby mode, the program includes instructions to: continue running a timer other than a first timer.

Optionally, in terms of stopping running the timer other than the first timer, the program includes instructions to: stop running the timer other than the first timer in response to a UE being incapable of running a timer in the standby mode.

Optionally, in terms of stopping running the timer, the program includes instructions to: stop running the timer in response to a UE being incapable of running a timer in the standby mode.

Optionally, in terms of starting the standby mode, the program includes instructions to: continue running a timer other than a first timer in response to a UE being capable of running a timer in the standby mode.

Optionally, in terms of starting the standby mode, the program includes instructions to: start a second timer.

Optionally, in terms of starting the standby mode, the program includes instructions to: start a second timer in response to a UE being capable of running a timer in the standby mode.

In a possible example, in embodiments of the disclosure, the program includes instructions to: stop a standby mode.

Optionally, in terms of stopping the standby mode, the program includes instructions to: start a first timer in response to stopping the standby mode.

Optionally, in terms of stopping the standby mode, the program includes instructions to: detect a wake-up signal, and stop the standby mode.

Optionally, in terms of stopping the standby mode, the program includes instructions to: perform idle-state tasks and/or inactive-state tasks.

Optionally, in terms of stopping the standby mode, the program includes instructions to: stop the standby mode in response to a second measurement value being less than or equal to a second threshold.

Optionally, the program also includes instructions to: obtain the second measurement value by measuring a reference signal.

Optionally, the reference signal includes a cell ID.

Optionally, in terms of stopping the standby mode, the program includes instructions to: stop the standby mode in response to a second timer expiring.

Optionally, in terms of stopping the standby mode, the program includes instructions to: perform idle-state tasks and/or inactive-state tasks.

Optionally, the program also includes instructions to: set a value of a first timer to a first value in response to a first measurement value being less than or equal to a first threshold.

Optionally, the program also includes instructions to: restart a first timer in response to performing a random access procedure, RRM measurement, cell reselection evaluation, or cell selection.

Optionally, the program also includes instructions to: restart a first timer in response to performing SDT.

As can be seen, through the UE described in embodiments of the disclosure, the standby mode is introduced, and the standby mode can be started and stopped, thereby saving power for the UE. Specifically, the standby mode can be introduced as a state of the UE independent of an idle state or an inactive state. When the UE is in the idle state or the inactive state, the UE can start the standby mode and open a low-power receiver, thereby switching from the idle state or the inactive state to the standby mode. When the UE is in the standby mode, the UE can stop the standby mode and open a legacy receiver, thereby switching from the standby mode to the idle state or the inactive state. Alternatively, the standby mode can be introduced as a substate of the idle state or the inactive state of the UE. When the UE is in a camped-normally substate, the UE can start the standby mode and open the low-power receiver, thereby switching from the camped-normally substate to the standby mode. When the UE is in the standby mode, the UE can stop the standby mode and open the legacy receiver, thereby switching from the standby mode to the camped-normally substate. Since in the standby mode, the legacy receiver is not in operation, the power consumption for conversion when the UE wakes up from deep sleep can be reduced, and the power consumption for the low-power receiver to detect a wake-up signal is small, thereby reducing the power consumption of the UE.

Embodiments of the disclosure also provide a chip configured to start a standby mode.

Embodiments of the disclosure also provide a chip module. The chip module includes a transceiver component and a chip. The chip is configured to start a standby mode.

Embodiments of the disclosure also provide a chip configured to stop a standby mode.

Embodiments of the disclosure also provide a chip module. The chip module includes a transceiver component and a chip. The chip is configured to stop a standby mode.

Embodiments of the disclosure also provide a computer storage medium. The computer storage medium stores programs which, when executed, are configured to perform some or all of steps of any method for mode control described in the method embodiments.

Embodiments of the disclosure also provide a computer program product. The computer program product includes a non-transitory computer-readable storage medium storing computer programs. The computer programs are operable with a computer to perform some or all of steps of any method for mode control described in embodiments of the disclosure.

Although the disclosure is described with reference to the embodiments, in a process of implementing the disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of the disclosure may be provided as a method, an apparatus (device), or a computer program product. Therefore, the disclosure may use a form of hardware only embodiments, software only embodiments, or embodiments with a combination of software and hardware. Moreover, the disclosure may use a form of a computer program product that is implemented on one or more computer-usable storage media (including but not limited to a disk memory, a CD-ROM, an optical memory, and the like)

that include computer usable program code. The computer program is stored/distributed in a proper medium and is provided as or used as a part of the hardware together with other hardware, or may use another allocation form, such as by using the Internet or another wired or wireless telecommunications system.

The disclosure is described with reference to the flowcharts and/or block diagrams of the method, the apparatus (device), and the computer program product according to the embodiments of the disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the disclosure is described with reference to specific features and the embodiments thereof, apparently, various modifications and combinations may be made to them without departing from the spirit and scope of the disclosure. Correspondingly, the specification and accompanying drawings are merely example description of the disclosure defined by the accompanying claims, and is considered as any of or all modifications, variations, combinations or equivalents that cover the scope of the disclosure. Apparently, a person skilled in the art can make various modifications and variations to the disclosure without departing from the spirit and scope of the disclosure. The disclosure is intended to cover these modifications and variations of the disclosure provided that they fall within the scope of the claims and their equivalent technologies.

Embodiments of the disclosure provide a method for mode control and related products, which help reduce the power consumption for conversion of waking up from deep sleep and the power consumption of signal detection.

In a first aspect of embodiments of the disclosure, a method for mode control is provided. The method includes: starting a standby mode.

In a second aspect of embodiments of the disclosure, a method for mode control is provided. The method includes: stopping a standby mode.

In a third aspect of embodiments of the disclosure, a communication device is provided. The device includes a starting unit. The starting unit is configured to start a standby mode.

In a fourth aspect of embodiments of the disclosure, a communication device is provided. The device includes a stopping unit. The stopping unit is configured to stop a standby mode.

In a fifth aspect of embodiments of the disclosure, a chip module is provided. The chip module includes a transceiver component and a chip. The chip is configured to start a standby mode.

In a sixth aspect of embodiments of the disclosure, a chip is provided. The chip is configured to start a standby mode.

In a seventh aspect of the disclosure, a chip module is provided. The chip module includes a transceiver component and a chip. The chip is configured to stop a standby mode.

In an eighth aspect of the disclosure provides a chip. The chip is configured to stop a standby mode.

In a ninth aspect of the disclosure, a user equipment (UE) is provided. The UE includes a processor, a memory, and one or more programs. The one or more programs are stored in the memory and configured to be executed by the processor. The one or more programs includes instructions for performing some or all of steps described in the first aspect or the second aspect.

In a tenth aspect of embodiments of the disclosure, a computer-readable storage medium is provided. The computer-readable storage medium is used to store computer programs. The computer programs are operable with a computer to perform some or all of steps described in the first aspect or the second aspect of embodiments of the disclosure.

In an eleventh aspect of embodiments of the disclosure, a computer program product is provided. The computer program product includes a non-transitory computer-readable storage medium storing computer programs. The computer programs are operable with a computer to perform some or all of steps described in the first aspect or the second aspect of embodiments of the disclosure. The computer program product may be a software installation package.

Embodiments of the disclosure may achieve the following beneficial effects.

As can be seen, according to the method for mode control and related products described in embodiments of the disclosure, a standby mode is introduced, and the standby mode can be started and stopped, thereby saving power for the UE. Specifically, the standby mode can be introduced as a state of the UE independent of an idle state or an inactive state. When the UE is in the idle state or the inactive state, the UE can start the standby mode and open a low-power receiver, thereby switching from the idle state or the inactive state to the standby mode. When the UE is in the standby mode, the UE can stop the standby mode and open a legacy receiver, thereby switching from the standby mode to the idle state or the inactive state. Alternatively, the standby mode can be introduced as a substate of the idle state or the inactive state of the UE. When the UE is in a camped-normally substate, the UE can start the standby mode and open the low-power receiver, thereby switching from the camped-normally substate to the standby mode. When the UE is in the standby mode, the UE can stop the standby mode and open the legacy receiver, thereby switching from the standby mode to the camped-normally substate. Since in the standby mode, the legacy receiver is not in operation, the power consumption for conversion when the UE wakes up from deep sleep can be reduced, and the power consumption for the low-power receiver to detect a wake-up signal is small, thereby reducing the power consumption of the UE.

What is claimed is:

1. A method for mode control, comprising:

starting a standby mode and skipping performing idle-state tasks and/or inactive-state tasks; and in response to detecting a wake-up signal, stopping the standby mode, performing idle-state tasks and/or inactive-state tasks, and starting a first timer.

2. The method of claim 1, wherein starting the standby mode comprises:

stopping running a first timer.

3. The method of claim 1, wherein starting the standby mode comprises:

stopping running a timer other than a first timer; or stopping running the timer other than the first timer in response to a user equipment (UE) being incapable of running a timer in the standby mode.

4. The method of claim 1, wherein starting the standby mode comprises:

stopping running a timer; or stopping running the timer in response to a UE being incapable of running a timer in the standby mode.

5. The method of claim 1, wherein starting the standby mode comprises:

continuing running a timer other than a first timer; or continuing running the timer other than the first timer in response to a UE being capable of running a timer in the standby mode.

6. The method of claim 1, wherein starting the standby mode comprises:

starting a second timer.

7. The method of claim 1, wherein starting the standby mode comprises:

starting a second timer in response to a UE being capable of running a timer in the standby mode.

8. A communication device, comprising:

a transceiver;

a memory configured to store computer programs; and a processor configured to execute the computer programs stored in the memory to:

start the standby mode and skip performing idle-state tasks and/or inactive-state tasks; and in response to detecting a wake-up signal, stop a standby mode, perform idle-state tasks and/or inactive-state tasks, and start a first timer.

9. The communication device of claim 8, wherein the processor configured to start the standby mode is specifically configured to:

stopping running a first timer.

* * * * *